April 12, 1960     R. TENNLER     2,932,508
INTERMITTENT FEED, WEB PROCESSING APPARATUS
Filed July 1, 1958     5 Sheets-Sheet 1

INVENTOR:
ROLF TENNLER
By
Richardson, David and Nardon
Att'ys.

April 12, 1960  R. TENNLER  2,932,508
INTERMITTENT FEED, WEB PROCESSING APPARATUS
Filed July 1, 1958  5 Sheets-Sheet 2

INVENTOR:
ROLF TENNLER
by
Richardson, David and Nerdon
Attys.

INVENTOR
ROLF TENNLER

April 12, 1960  R. TENNLER  2,932,508
INTERMITTENT FEED, WEB PROCESSING APPARATUS
Filed July 1, 1958  5 Sheets-Sheet 5

INVENTOR:
ROLF TENNLER
by
Richardson, Davis and Nardon
ATTYS.

United States Patent Office 2,932,508
Patented Apr. 12, 1960

2,932,508

INTERMITTENT FEED, WEB PROCESSING APPARATUS

Rolf Tennler, Stuttgart-Bad Cannstatt, Germany, assignor to Firma Fr. Hesser Maschinenfabrik-Aktiengesellschaft, Stuttgart-Bad Cannstatt, Germany, a corporation of Germany Application July 1, 1958, Serial No. 745,950

Claims priority, application Germany July 6, 1957

13 Claims. (Cl. 271—2.4)

This invention relates to the feeding of a web of material, such as paper, cardboard, sheeting and the like, to a machine designed to intermittently treat the material at a treating position, such as a punch.

The known punches frequently are arranged immediately after other working machines for treating the web of material, e.g., to rotary printing presses. Thus, there is the problem of converting the continuous conveying motion with which the material web leaves the preceding machine into an intermittent motion for the following working machine.

Although many attempts were made to overcome the foregoing difficulty and other difficulties, none, as far as I am aware, was entirely successful when carried into practice commercially on an industrial scale.

It is an object of this invention to provide a feeding system of simple design, readily adjustable, to control the web of material fed to the working machine in such a manner that the portion of the web treated at any time at the treating position by the machine, has zero velocity at the moment of treatment.

Other objects and advantages of the invention will become apparent from the following description taken in conjunction with the accompanying drawings, in which:

Fig. 3a is a cross sectional view of the differential gear shown in Fig. 1a;

Figure 1:
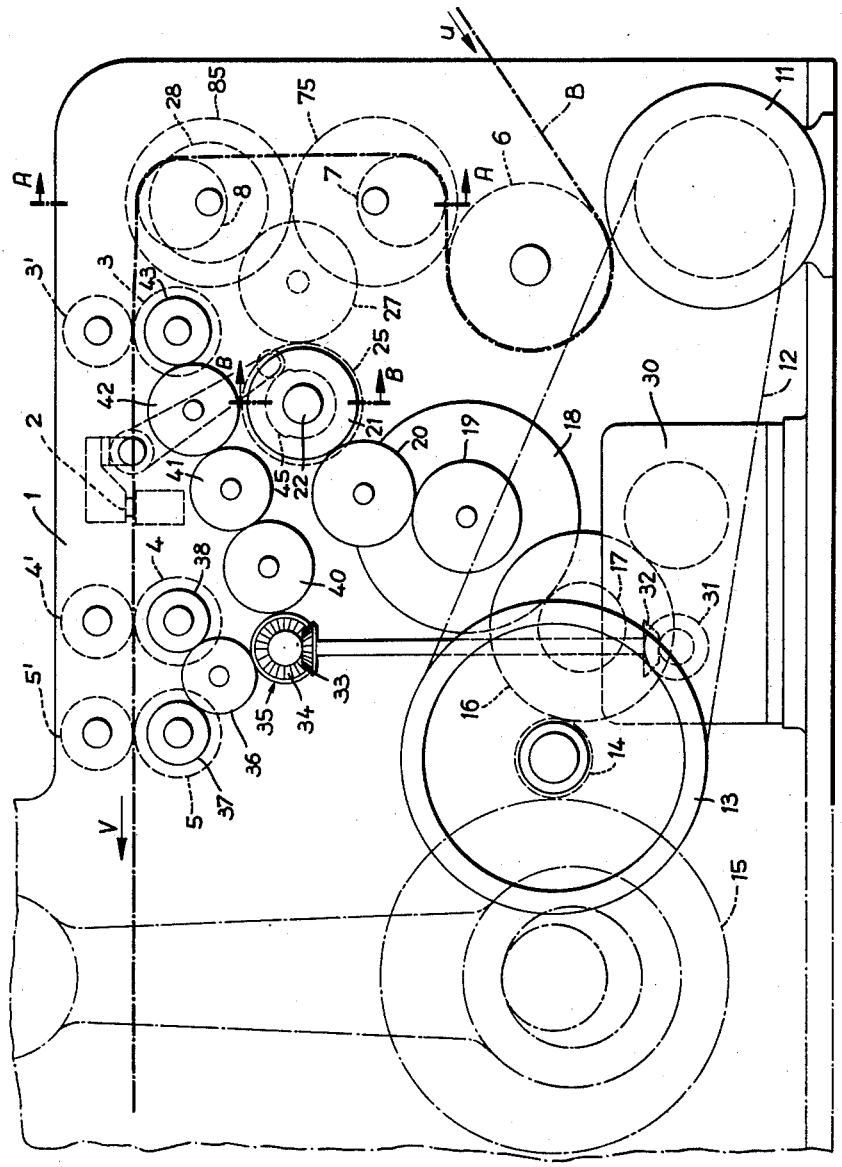
Fig. 1 is a side view of one embodiment of the invention showing a feed system for a web of material with a pair of eccentric rollers.

Referring to Fig. 1 the feed system according to the present invention is mounted by way of example into the frame 1 of a machine, e.g., a punch. The machine frame 1 is further provided with a retaining device 2 for holding the material stationary for treatment at a treating position and pairs of feed rollers 3, 3', 4, 4', 5, 5' feeding the web B directly to the treatment means, e.g., the punching tools of the punch.

Figure 2:
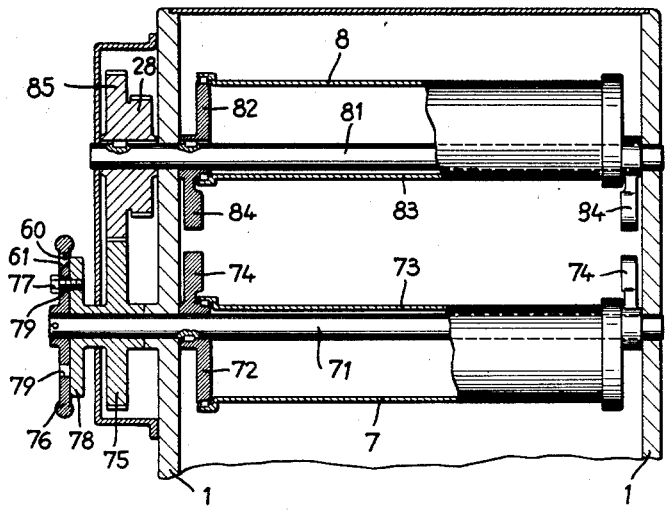
Fig. 2 shows the disposition of the pair of eccentric rollers in longitudinal section in the plane A—A of Fig. 1.

The web B arriving at uniform velocity $u$ at the feeding system is passed around a deflection roll 6 and—with the embodiments shown in Figs. 1 and 2—over a pair of eccentric rollers 7, 8, eccentrically mounted in the machine frame 1, to the front pair of feed rollers 3, 3', the lower roller 3 of which simultaneously serves as a deflection roll.

The eccentric rollers 7, 8 comprise roller bodies 72, 82 (Fig. 2) eccentrically secured to shafts 71, 81. The roller bodies 72, 82 have rotatively mounted thereon, e.g., by means of antifriction bearings, a jacket 73, 83. In order to compensate for the centrifugal forces produced by the rotational movement of the eccentric rollers 7, 8 the roller bodies 72, 82 are provided with counterweights 74, 84. The shafts 71, 81 are connected with each other by means of gear wheels 75, 85.

To enable the pair of eccentric rollers 7, 8 to be shifted in phase relatively to each other, the gear wheel 75 is not directly secured to the shaft 71 but is releasably connected to a hand wheel 76 fixedly mounted on the shaft 71. The hand wheel 76 may be connected with the gear wheel 75, e.g., by clamping the hand wheel 76 by means of a screw 77 to a disc 78 integrally formed with the gear wheel 75. The screw 77 is disposed in an arcuate slot 79 of the hand wheel 76 so that the latter and accordingly eccentric roller 7 may be placed at any desired angle relative to eccentric roller 8.

Figure 4:
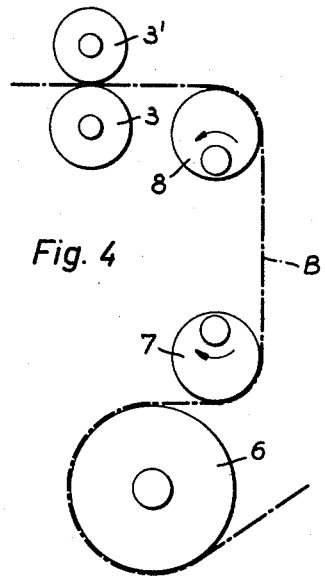
Fig. 4 shows the pair of eccentric rollers in an operating position.
Figure 8:
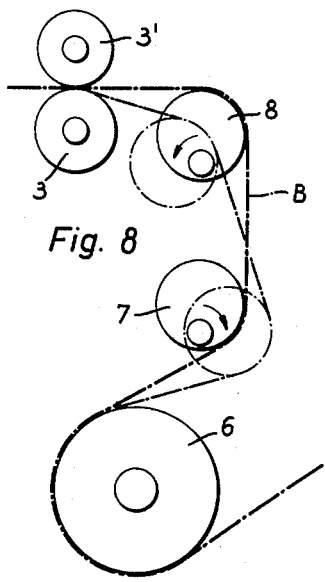
Fig. 8 shows the pair of eccentric rollers 180° out of phase with respect to Figs. 4–7.

By shifting the relative phase of the eccentric rollers their effective stroke and thus the size of the web loop formed by the guide rollers 7, 8 will be varied, as will be seen by comparing Fig. 4 with Fig. 8. The size of the web loop is in its turn dependent upon the amount of the necessary advance, i.e., in the case of a punch upon the length of the blank. This arrangement permits the adjustment of the feeding system in a simple manner to any length of blank. A scale 60 is provided on the disc 78 in combination with a pointer 61 attached to the hand wheel 76.

Figure 9:
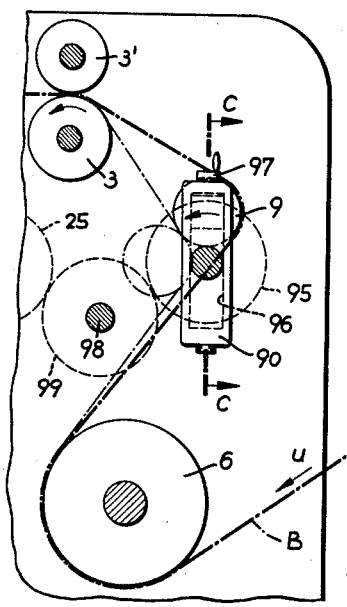
Fig. 9 shows another embodiment of the invention with a single eccentric roller.
Figure 10:
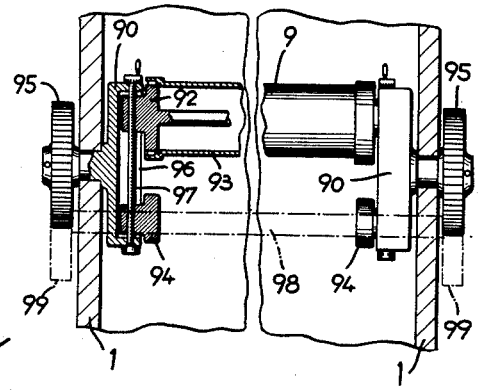
Fig. 10 is a longitudinal sectional view of the feeding system according to Fig. 9 in the plane C—C.

In the embodiment shown in Figs. 9 and 10 for a punch, a single eccentric roller 9 mounted on crank arms 90 is disposed between the deflecting rollers 6 and 3. The jacket 93 of roller 9 is again rotatably mounted, e.g., by means of antifriction bearings, on the actual roller body 92. In order to adjust the loop size to correspond to the blank length, the roller body 92 is radially shiftable by means of spindles 97 in suitable guide members 96 of the crank arms 90. In addition to that counterweights 94 are mounted within the guide members 96 of the crank arms 90, which counterweights, upon displacement of the roller body are simultaneously shifted in a direction opposite to that of the eccentric roller 9. Each crank arm 90 has rigidly secured thereto a gear wheel 95. These gear wheels 95 are in engagement with gear wheels 99 on a common shaft 98.

The drive for the feeding system is derived from the main drive of the machine, e.g., the punch, since the feeding system is cooperating synchronously with the machine. For this purpose, an electric motor 11 has driving connection by means of a belt 12 with a pulley 13 rigidly secured to a gear wheel 14. This gear wheel 14 is in engagement with a drive wheel 15 for the machine, e.g., the punch and a gear wheel 16 driving a gear train comprising the gear wheels 17, 18, 19, 20, 21 and a shaft 22. The other end of this shaft 22 has secured thereto a hand wheel 23 which by means of a releasable clamp connection, e.g., a screw 24, is fixed to a disc 26 attached to a gear wheel 25. In the first embodiment, this gear wheel 25 is in engagement with a gear wheel 27, driving a gear wheel 28 integral with the gear wheel 85 thus imparting a rotary motion to the pair of eccentric rollers 7, 8.

In the second embodiment, the gear wheel 25 is in driving engagement with a gear wheel 99 secured to the shaft 98 (Figs. 9 and 10) imparting through the gear wheels 95 a rotary motion to the crank arms 90.

The clamp connection between the hand wheel 23 and the disc 26 (Fig. 3) has for its purpose to permit the phase of the feeding system to be brought into a desired predetermined relationship with respect to that of the working machine, e.g., the punch.

The drive of the pairs of feed rollers 3, 3', 4, 4', 5, 5' is derived from the gear wheel 16 driving through a variable speed drive or an infinitely variable gear 30 and a bevel gearing, comprising the bevel wheels 31, 32, 33, 34, and a gear wheel 35 rigidly connected to the bevel wheel 34. This gear wheel 35 is in driving connection through a gear wheel 36 with gear wheels 37, 38 connected to the rollers 4, 5 and through intermediate wheels 40, 41, 42 with a gear wheel 43 connected to the roller 3.

The mode of operation of the systems described hereinabove is as follows:

The web B fed at the constant velocity $u$ is passed around the lower deflection roller 6, over the eccentric rollers 7, 8 and through the pair of feed rollers 3, 3' to the retaining device 2 and to the pair of feed rollers 4, 4', 5, 5'. The eccentric rollers 7 and 8 are forming, during any revolution thereof as the web B passes over the eccentric rollers 7 and 8 a web loop of predetermined size, adjustable by means of hand wheel 76, until the web velocity beyond the loop at the retaining device 2 and at the treating position will be zero. At this moment the retaining device 2 is operated by means of a cam disc 45 secured to the shaft 22. At the same time the treating operation of the machine takes place.

Upon termination of the treatment at the treating position, the loop is recovered by the feed rollers 3, 4', 4, 4', 5, 5' to the extent permitted by the continuously revolving eccentric rollers 7, 8 until the latter reach the position in which another looping and retarding of the web velocity occurs. During this period, feed rollers 3, 4, 5 are driven with a peripheral rotational speed which is higher than the feeding velocity of the web. This will cause a slip between the web B and the feed rollers 3, 4, 5 the friction of which is, however, owing to the slight pressure of the upper rollers 3', 4', 5' within permissible limits.

The mode of operation of the feed system shown in Figs. 9 and 10 is substantially similar to that described hereinbefore.

Figure 11:
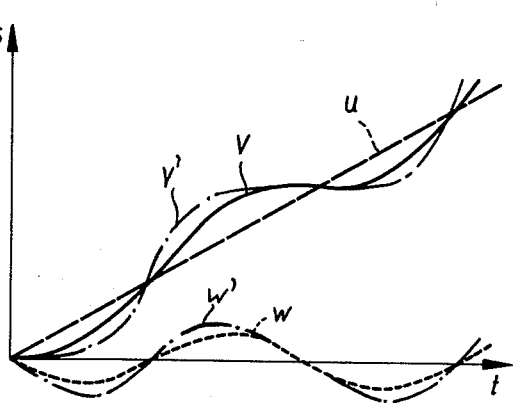
Fig. 11 shows a travel/time diagram of the web velocity in relation to the treatment.

The motion of web B in relation to the treating position is illustrated by way of a travel/time diagram in Fig. 11 in which $u$ is the velocity of the continuously fed web B, and W the instantaneous velocities imparted by the eccentric rollers to the web. The curve V shows the resulting velocity measured at the retaining point.

From this diagram it appears that the web velocity at the treating position during each cycle is progressively retarded up to zero and is then after a certain period of standing still, likewise progressively accelerated again so that even with higher operating velocities a precise advance to the working machine, e.g., a punch, assuring accuracy as to size, takes place.

Figure 5:
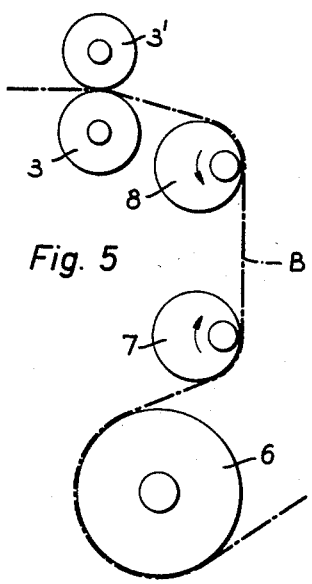
Fig. 5 shows the pair of eccentric rollers in a different operating position.
Figure 6:
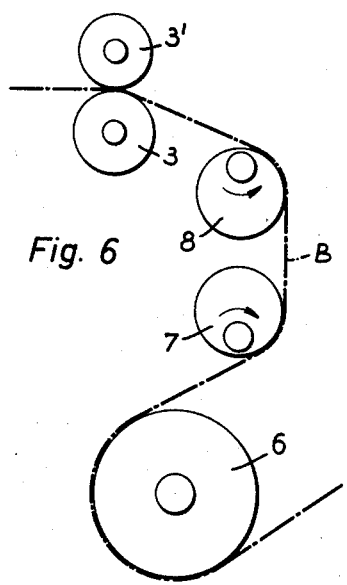
Fig. 6 shows the pair of eccentric rollers in still another operating position.
Figure 7:
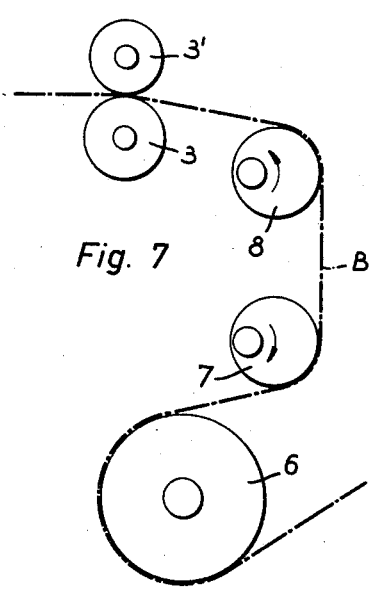
Fig. 7 shows the pair of eccentric rollers in yet another operating position.

In order to further prolong in certain cases the period of standstill of the web B, the eccentric rollers may receive an increasing and decreasing speed of drive by means of an additional gearing in such a manner that the formation of the web loop (Figs. 6 and 7) will take place slower than its recovery (Figs. 4 and 5) by the feed rollers 3, 3'.

Figure 1A:
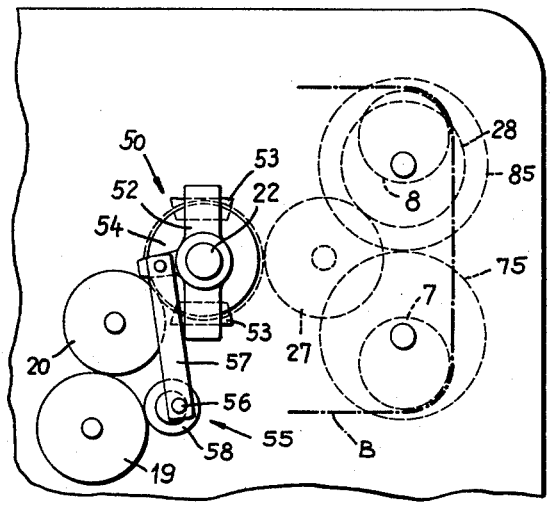
Fig. 1a is a view similar to that of Fig. 1 and shows a differential gear provided to drive the eccentric rollers.
Figure 3A:
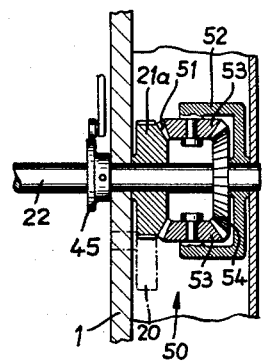

For this purpose and according to this embodiment of the eccentric roller drive a differential gear designated generally as 50 is mounted on the shaft 22 as shown in Figs. 1a and 3a. The differential gear 50 is oscillated by means of a crank mechanism 55, whereby the uniform rotational movement will be modified by an oscillating component motion. The differential gear comprises a beveled wheel 51 rotatably mounted on shaft 22 and rigidly secured to gear wheel 21a and meshing with a pair of bevel pinions 53 mounted on a cage 52. These beveled pinions 53 are in mesh with a beveled gear 54 fixed to shaft 22. The crank mechanism 55 producing said oscillating motion comprises a crank pin 56 and a connecting rod 57 pivoted to the cage 52 of the differential gear 50 and is driven from the gear wheel 19 through a gear wheel 58 at twice the speed of the shaft 22.

Figure 1B:
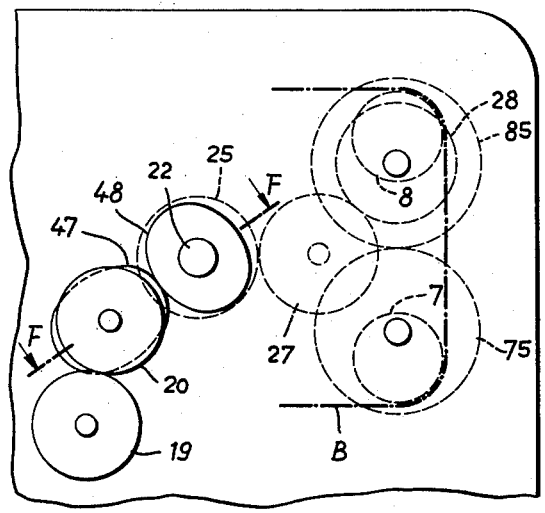
Fig. 1b is a view similar to that of Fig. 1 and shows elliptical gearing provided to drive the eccentric rollers.
Figure 3B:
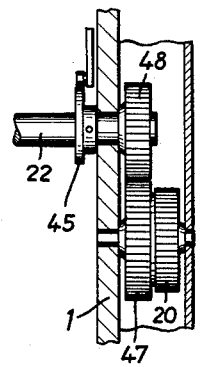
Fig. 3b is a cross sectional view of the elliptical gearing shown in Fig. 1b in the plane F—F.
Figure 3:
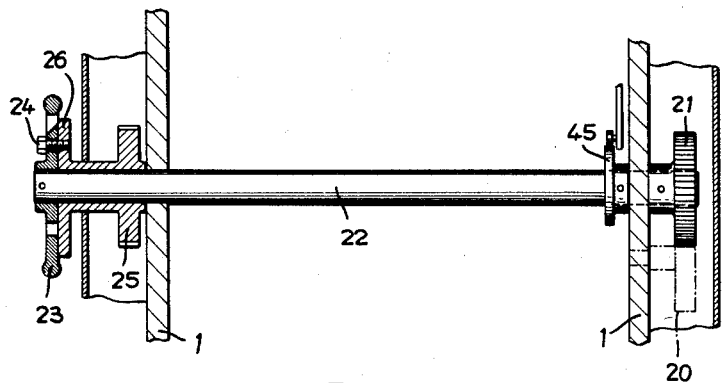
Fig. 3 is a sectional elevational view in the plane B—B of Fig. 1.

A further possibility (Figs. 1b and 3b) for producing the increasing and decreasing speed range of the drive of the eccentric rollers consists in securing to shaft 22 an elliptical gear wheel 48 meshing with a likewise elliptical gear wheel 47 secured to gear wheel 20. It will be noted, that with this type of gearing the desired web motion may be realized in which a prolonged period of standstill is provided. The velocity relationships of web B obtained by the use of the additional gearings described hereinbefore are illustrated in Fig. 11 with dot and dash lines. Such gearings providing an increasing and decreasing drive of the eccentric rollers may of course find application also in combination with the embodiment of the feeding system having only one eccentric roller.

It is to be observed that the present invention provides for motion converting means to be used in connection with a machine designed to intermittently treat a web of material fed to said machine continuously, whereby the continuous conveying motion at uniform velocity at which the material is being fed to the machine is converted into an intermittent motion so that the material is periodically stationary at a treating position in said machine. Said means comprise, intermittently operative continuously driven slipping feed rollers 3, 3', 4, 4', 5, 5' which feed the web of material into the machine cyclically in synchronism with the repetition rate of treatment, a constant speed delivery means 6 feeding the web to the feed rollers, an eccentric roller 9 (Figs. 9 and 10), located between the feed rollers and the delivery means, said eccentric roller operating in synchronism with said repetition rate, said eccentric roller engaging the web and forming a varying length loop between the delivery means and the feed rollers. The velocity of the moving web at its point of treatment thereby varies from zero up to a predetermined maximum value, the maximum velocity corresponding to the engagement of the web by the portion of the eccentric roller of minimum radius of eccentricity. The eccentric roller can be mounted in guide members 96 and can be radially displaced in the guide members to vary the eccentricity of said rollers (Fig. 9).; or, there can be a pair of eccentric rollers 7 and 8 (Fig. 1), and the phase angle between said pair of eccentric rollers can be adjusted to vary the size of the loop formed in the web (Fig. 4 and Fig. 8), e.g., the driving shafts 71 and 81 of the pair of eccentric rollers can be connected by a pair of gear wheels of equal size 75 and 85, one of the eccentric rollers 7 being adjustable with respect to the other 8 by adjustment of its angular position on shaft 71 and its associated gear wheel 75. The driving shaft of the adjustable eccentric roller 7 may have an adjustable hand wheel 76 at one end connected to the gear wheel 75 of said adjustable eccentric roller, said gear wheel 75 being rotationally displaceable on said driving shaft 71.

Furthermore, in order to increase the size of the web loop, the invention provides for additional gearing (Figs. 1a and 3a) to be used with either the embodiment having one eccentric roller or the embodiment having two eccentric rollers, said gearing having an oscillatory differential mechanism comprising a differential gear 50 driven by a crank pin 56 and a connecting rod 57. The differential mechanism may also have a cage 52 angularly displaceable by the crank arm 57, the cage having a shaft 22 passing through it. A pair of beveled gears 51 and 54 are fixed to said shaft inside the cage, one on each side of said cage, and each facing the center of the cage. Driving pinions 53 secured to the top and bottom of the cage engage the beveled gears, the rotation of the cage thus causing the pinions to drive the gears at varying angular velocities. The crank arm can be driven at double the speed of the shaft 22 passing through the cage.

Moreover, the invention provides that the eccentric roller or rollers may be on a shaft having an elliptical gear wheel 48 in engagement with a likewise elliptical gear wheel 47 (Figs. 16 and 36) in engagement with gearing driven by the driving means of the machine.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention as defined in the appended claims.

What is claimed is:

1. In a machine designed to intermittently treat a web of material fed to said machine continuously, means to convert the continuous conveying motion at uniform velocity at which the material is being fed to the machine into an intermittent motion so that the material is periodically stationary at a treating position in said machine, said means comprising, continuously driven feed rollers which slippably engage and feed the web of material into said machine cyclically in synchromism with the repetition rate of treatment, a constant speed delivery means feeding the web to the feed rollers, at least one eccentric roller located between the feed rollers and the delivery means, said eccentric roller operating in synchronism with said repetition rate, said eccentric roller engaging the web and forming a varying length loop between the delivery means and the feed rollers whereby the velocity of the moving web at its point of treatment varies from zero to a predetermined maximum value, the maximum velocity corresponding to the engagement of the web by the portion of the eccentric roller of minimum radius and driving means for said eccentric roller including releasable means angularly displaceable with respect to said eccentric roller for changing the phase relationship between said eccentric roller and the cycle of said repetition rate.

2. In a machine designed to intermittently treat a web of material fed to said machine continuously, means to convert the continuous conveying motion at uniform velocity at which the material is being fed to the machine into an intermittent motion so that the material is periodically stationary at a treating position in said machine, said means comprising, intermittently operating feed rollers which feed the web of material into said machine cyclically in synchronism with the repetition rate of treatment, a constant speed delivery means feeding the web to the feed rollers, at least one eccentric roller located between the feed rollers and the delivery means, said eccentric roller being mounted in guide members and being radially displaceable in said guide members to vary the eccentricity of said roller, said eccentric roller operating in synchronism with said repetition rate, said eccentric roller engaging the web and forming a varying length loop between the delivery means and the feed rollers whereby the velocity of the moving web at its point of treatment varies from zero to a predetermined maximum value, the maximum velocity corresponding to the engagement of the web by the portion of the eccentric roller of minimum radius, and means operated in synchronism with said eccentric roller for holding said web stationary during the course of said treatment.

3. In a machine designed to intermittently treat a web of material fed to said machine continuously, means to convert the continuous conveying motion at uniform velocity at which the material is being fed to the machine into an intermittent motion so that the material is periodically stationary at a treating position in said machine, said means comprising, intermittently operating feed rollers which feed the web of material into said machine cyclically in synchronism with the repetition rate of treatment, a constant speed delivery means feeding the web to the feed rollers, a pair of eccentric rollers located between the feed rollers and the delivery means, adjustable means rotating with at least one of said eccentric rollers whereby the phase angle between said pair of eccentric rollers is adjustable to vary the size of the loop formed in the web, said eccentric rollers operating in synchronism with said repetition rate, said eccentric rollers engaging the web and forming a varying length loop between the delivery means and the feed rollers whereby the velocity of the moving web at its point of treatment varies from zero to a predetermined maximum value, the maximum velocity corresponding to the engagement of the web by the portion of the eccentric rollers of minimum radius.

4. In a machine designed to intermittently treat a web of material fed to said machine continuously, means to convert the continuous conveying motion at uniform velocity at which the material is being fed to the machine into an intermittent motion so that the material is periodically stationary at a treating position in said machine, said means comprising, intermittently operating feed rollers which feed the web of material into said machine cyclically in synchronism with the repetition rate of treatment, a constant speed delivery means feeding the web to the feed rollers, a pair of eccentric rollers located between the feed rollers and the delivery means, the driving shafts of said pair of eccentric rollers being connected by gear wheels of equal size, one of said eccentric rollers being adjustable with respect to the other roller by turning its shaft and its associated gear wheel, said eccentric rollers operating in synchronism with said repetition rate, said eccentric rollers engaging the web and forming a varying length loop between the delivery means and the feed rollers whereby the velocity of the moving web at its point of treatment varies from zero to a predetermined maximum value, the maximum velocity corresponding to the engagement of the web by the portion of the eccentric rollers of minimum radius.

5. Motion converting means as claimed in claim 4, wherein the driving shaft of the adjustable eccentric roller has an adjustable hand wheel at one end connected to the gear wheel of said roller, said gear wheel being freely rotatable on said driving shaft.

6. In a machine designed to intermittently treat a web of material fed to said machine continuously, means to convert the continuous conveying motion at uniform velocity at which the material is being fed to the machine into an intermittent motion so that the material is periodically stationary at a treating position in said machine, said means comprising, intermittently operating feed rollers which feed the web of material into said machine cyclically in synchronism with the repetition rate of treatment, a constant speed delivery means feeding the web to the feed rollers, at least one eccentric roller located between the feed rollers and the delivery means, drive means for said eccentric roller comprising differential gear mechanism interconnecting said machine and said eccentric roller and comprising an oscillatory cage member which varies the angular velocity of said eccentric roller with respect to said drive means, means for oscillating said cage member in synchronism with said repetition rate, said eccentric roller engaging the web and forming a varying length loop between the delivery means and the feed rollers whereby the velocity of the moving web at its point of treatment varies from zero to a predetermined maximum value, the maximum velocity corresponding to the engagement of the web by the portion of the eccentric roller of minimum radius.

7. In a machine designed to intermittently treat a web of material fed to said machine continuously, means to convert the continuous conveying motion at uniform velocity at which the material is being fed to the machine into an intermittent motion so that the material is periodically stationary at a treating position in said machine, said means comprising, intermittently operating feed rollers which feed the web of material into said machine cyclically in synchronism with the petition rate of treatment, a constant speed delivery means feeding the web to the feed rollers, an eccentric roller located between the feed rollers and the delivery means, said eccentric roller being driven by gearing having a differential mechanism comprising a cage rotatable by a crank and a crank arm pivoted to said cage, a shaft passing through said cage, a pair of beveled gears fixed to said shaft inside the cage, one on each side of said cage, and each facing the center of the cage, driving pinions, one secured to the top, the other secured to the bottom of the cage, in engagement with the beveled gears, the rotation of the cage causing the pinions to drive the beveled gears, said eccentric roller operating in synchronism with said repetition rate, said eccentric roller engaging the web and forming a varying length loop between the delivery means and the feed rollers whereby the velocity of the moving web at its point of treatment varies from zero to a predetermined maximum value, the maximum velocity corresponding to the engagement of the web by the portion of the eccentric roller of minimum radius.

8. Motion converting means as claimed in claim 7, wherein the crank arm pivoted to the cage is driven by the crank at double the speed of the shaft passing through the cage.

9. In a machine designed to intermittently treat a web of material fed to said machine continuously, means to convert the continuous conveying motion at uniform velocity at which the material is being fed to the machine into an intermittent motion so that the material is periodically stationary at a treating position in said machine, said means comprising, intermittently operating feed rollers which feed the web of material into said machine cyclically in synchronism with the repetition rate of treatment, a constant speed delivery means feeding the web to the feed rollers, an eccentric roller located between the feed rollers and the delivery means, said eccentric roller being mounted on a shaft having an elliptical gear wheel in engagement with a similar elliptical gear wheel which in turn is in engagement with gearing driven by the driving means of the machine, said eccentric roller operating in synchronism with said repetition rate, said eccentric roller engaging the web and forming a varying length loop between the delivery means and the feed rollers whereby the velocity of the moving web at its point of treatment varies from zero to a predetermined maximum value, the maximum velocity corresponding to the engagement of the web by the portion of the eccentric roller of minimum radius.

10. In a machine designed to intermittently treat a web of material fed to said machine continuously, means to convert the continuous conveying motion at uniform velocity at which the material is being fed to the machine into an intermittent motion so that the material is periodically stationary at a treating position in said machine, said means comprising, intermittently operating feed rollers which feed the web of material into said machine cyclically in synchronism with the repetition rate of treatment, a constant speed delivery means feeding the web to the feed rollers, a pair of eccentric rollers located between the feed rollers and the delivery means, drive means for said eccentric rollers comprising differential gear means including an angularly displaceable cage interconnecting said machine and said rollers, angular displacement of said cage varying the angular phase relationship between said machine and said rollers, and means for oscillating said cage in synchronism with said repetition rate, said eccentric rollers engaging the web and forming a varying length loop between the delivery means and the feed rollers whereby the velocity of the moving web at its point of treatment varies from zero to a predetermined maximum value, the maximum velocity corresponding to the engagement of the web by the portion of the eccentric rollers of minimum radius.

11. In a machine designed to intermittently treat a web of material fed to said machine continuously, means to convert the continuous conveying motion at uniform velocity at which the material is being fed to the machine into an intermittent motion so that the material is periodically stationary at a treating position in said machine, said means comprising, intermittently operating feed rollers which feed the web of material into said machine cyclically in synchronism with the repetition rate of treatment, a constant speed delivery means feeding the web to the feed rollers, a pair of eccentric rollers located between the feed rollers and the delivery means, said eccentric rollers being driven by gearing having a differential mechanism comprising a cage rotatable by a crank and a crank arm pivoted to said cage, a shaft passing through said cage, a pair of beveled gears fixed to said shaft inside the cage, one on each side of said cage, and each facing the center of the cage, driving pinions, one secured to the top, the other secured to the bottom of the cage, in engagement with the beveled gears, the rotation of the cage causing the pinions to drive the beveled gears, said eccentric rollers operating in synchronism with said repetition rate, said eccentric rollers engaging the web and forming a varying length loop between the delivery means and the feed rollers whereby the velocity of the moving web at its point of treatment varies from zero to a predetermined maximum value, the maximum velocity corresponding to the engagement of the web by the portion of the eccentric rollers of minimum radius.

12. Motion converting means as claimed in claim 11, wherein the crank arm pivoted to the cage is driven by the crank at double the speed of the shaft passing through the cage.

13. In a machine designed to intermittently treat a web of material fed to said machine continuously, means to convert the continuous conveying motion at uniform velocity at which the material is being fed to the machine into an intermittent motion so that the material is periodically stationary at a treating position in said machine, said means comprising, intermittently operating feed rollers which feed the web of material into said machine cyclically in synchronism with the repetition rate of treatment, a constant speed delivery means feeding the web to the feed rollers, a pair of eccentric rollers located between the feed rollers and the delivery means, said eccentric rollers being mounted on a shaft having an elliptical gear wheel in engagement with a similar elliptical gear wheel which in turn is in engagement with gearing driven by the driving means of the machine, said eccentric rollers operating in synchronism with said repetition rate, said eccentric rollers engaging the web and forming a varying length loop between the delivery means and the feed rollers whereby the velocity of the moving web at its point of treatment varies from zero to a predetermined maximum value, the maximum velocity corresponding to the engagement of the web by the portion of the eccentric rollers of minimum radius.

References Cited in the file of this patent

UNITED STATES PATENTS

| 2,650,823 | Chambon | Sept. 1, 1953 |
| 2,762,255 | Anderson | Sept. 11, 1956 |

FOREIGN PATENTS

| 6,369 | Great Britain | Feb. 25, 1898 |
| 123,066 | Sweden | Oct. 19, 1948 |